US012207051B2

(12) United States Patent
Lee

(10) Patent No.: US 12,207,051 B2
(45) Date of Patent: Jan. 21, 2025

(54) VIBRATION MODULE FOR PIEZOELECTRIC SPEAKER AND PANEL SPEAKER

(71) Applicant: SPT Co., Ltd., Seongnam-si (KR)

(72) Inventor: Hyeung Gyu Lee, Seoul (KR)

(73) Assignee: SPT Co., Ltd., Seongnam-si (KR)

( * ) Notice: Subject to any disclaimer, the term of this patent is extended or adjusted under 35 U.S.C. 154(b) by 245 days.

(21) Appl. No.: 18/018,039

(22) PCT Filed: Aug. 3, 2021

(86) PCT No.: PCT/KR2021/010156

§ 371 (c)(1),
(2) Date: Jan. 26, 2023

(87) PCT Pub. No.: WO2022/030956

PCT Pub. Date: Feb. 10, 2022

(65) Prior Publication Data

US 2023/0283960 A1 Sep. 7, 2023

(30) Foreign Application Priority Data

Aug. 3, 2020 (KR) ........................ 10-2020-0097083

(51) Int. Cl.
*H04R 17/00* (2006.01)
*H04R 1/40* (2006.01)
*H04R 7/02* (2006.01)

(52) U.S. Cl.
CPC ............. *H04R 17/00* (2013.01); *H04R 1/403* (2013.01); *H04R 7/02* (2013.01); *H04R 2499/11* (2013.01); *H04R 2499/15* (2013.01)

(58) Field of Classification Search
CPC .......... H04R 17/00; H04R 1/403; H04R 7/02; H04R 2499/11; H04R 2499/15
(Continued)

(56) References Cited

U.S. PATENT DOCUMENTS 9,173,030 B2 * 10/2015 Suzuki .................. G06F 1/1605
2010/0246863 A1 * 9/2010 Onishi .................. H04R 17/00 381/190
(Continued)

FOREIGN PATENT DOCUMENTS

JP H07-105988 B2 11/1995
KR 10-2012-0056020 A 6/2012
(Continued)

OTHER PUBLICATIONS

International Search Report in International Application No. PCT/KR2021/010156, dated Nov. 30, 2021, 2pages.

*Primary Examiner* — Sean H Nguyen
(74) *Attorney, Agent, or Firm* — Park, Kim & Suh, LLC

(57) ABSTRACT

The present invention provides a piezoelectric speaker and a vibration module for a panel speaker including a piezoelectric speaker and a vibration module for a panel speaker including one speaker unit being configured by including a diaphragm, and at least 3 piezoelectric resonators each being independently configured and attached to one surface of the diaphragm. As described above, according to the present invention, the acoustic properties of a piezoelectric speaker having the advantages of a thin speaker may be enhanced. Most particularly, the present invention may provide a piezoelectric speaker that is required in panel speakers of large-sized TVs, mobile devices, and so on, that can generate sufficient sound pressure and produce stable bass sound (or low frequency sound) at the same time, by resolving the disadvantages of insufficient sound pressure properties in the low frequency band, and by enhancing the smoothness of the sound pressure level (SPL).

8 Claims, 7 Drawing Sheets

(58) Field of Classification Search
USPC .......................................................... 381/190
See application file for complete search history.

(56) References Cited

U.S. PATENT DOCUMENTS

| | | | | |
|---|---|---|---|---|
| 2012/0230524 | A1* | 9/2012 | Chang .................. | H04R 17/005 381/190 |
| 2019/0379978 | A1* | 12/2019 | Lafort ...................... | H04R 7/02 |

FOREIGN PATENT DOCUMENTS

| | | | |
|---|---|---|---|
| KR | 10-2012-0064984 | A | 6/2012 |
| KR | 10-2012-0080882 | A | 7/2012 |
| KR | 10-2015-0019948 | A | 2/2015 |
| KR | 10-2019-0009188 | A | 1/2019 |
| KR | 10-2019-0116898 | A | 10/2019 |

* cited by examiner

VIBRATION MODULE FOR PIEZOELECTRIC SPEAKER AND PANEL SPEAKER

CROSS-REFERENCE TO RELATED APPLICATIONS

This application is the National Stage filing under 35 U.S.C. 371 of International Application No. PCT/KR2021/010156, filed on Aug. 3, 2021, which claims the benefit of Korean Patent Application No. 10-2020-0097083, filed on Aug. 3, 2020, the contents of which are all hereby incorporated by reference herein in their entirety.

FIELD OF THE INVENTION

The present invention relates to a piezoelectric speaker and a vibration module for a panel speaker and, most particularly, to a piezoelectric speaker and a vibration module for a panel speaker including a piezoelectric speaker and a vibration module for a panel speaker including one speaker unit being configured by including a diaphragm, and at least 3 piezoelectric resonators each being independently configured and attached to one surface of the diaphragm.

BACKGROUND ART

A piezoelectric speaker is configured of a structure (speaker unit) having a piezoelectric resonator (e.g., a piezoelectric ceramic having electrodes formed at both ends) combined with a diaphragm (of a metallic substance, such as bronze, phosphor copper, stainless steel, aluminum, and, so on, plastic, and so on), which produces sound (See FIG. 2). According to the principle of sound production, when an electrical signal (e.g., electrical signal of a sound (or voice)) is applied to a piezoelectric resonator modification corresponding to various resonant modes of the piezoelectric resonator occur, and such modifications are delivered in real-time to a diaphragm that is attached to the piezoelectric resonator so as to generate vibrations, thereby producing a sound.

With its thin and lightweight structure and low power consumption, the piezoelectric speaker is more advantageous than a dynamic speaker, which has been attracting attention as a panel speaker, which is applied to the recently highly demanded slim TV (OLED, QLED TVs, and so on) or as a speaker being equipped to various equipment (e.g., mobile display).

However, the related art piezoelectric speaker is disadvantageous for its poor sound quality in a low frequency range due to low sound pressure. A high-performance speaker generates high output in all frequency bands. That is, a high-performance speaker has a high sound pressure in all frequency bands and has a smooth and wide band.

Although the dynamic speaker has excellent properties in all frequency ranges from low-frequency to high-frequency, the dynamic speaker is disadvantageous for its thick and heavy-weight structure and high power consumption level. On the other hand, although the piezoelectric speaker has the advantageous properties of thinness, lightness, and low power consumption, the piezoelectric speaker is disadvantageous for having poor sound quality in the low frequency range (1000 Hz or less), as compared to the dynamic speaker.

As a method for compensating for the disadvantage of a low sound pressure in the low-frequency range of the piezoelectric speaker, the Korean Patent Publication No. 2012-0064984 (ref. left diagram of FIG. 1) discloses a structure that can enhance the low-frequency range by attaching a piezoelectric resonator to a diaphragm in a tilted structure or asymmetrical structure. In this structure, if the inclination angle is equal to a specific angle, the low frequency range may be enforced, thereby enhancing the quality of the bass sound. However, such structure is disadvantageous in that distortion of the sound quality may occur in other frequency ranges. Due to the difficulty in the manufacturing process of having to accurately maintain a specific angle for each product, this structure is disadvantageous in that a deviation may occur in each product. Additionally, the property enhancement of the low-frequency range targets sound pressure improvement at approximately 700~800 Hz. And, therefore, it is difficult to expect any enhancement effects in a lower low-frequency range of approximately 500 Hz.

Additionally, the Korean Patent Publication No. 2015-0019948 (ref. right diagram of FIG. 1) has been devised to insert an amplitude adjusting tube between the piezoelectric resonator and the diaphragm so as to generate an irregularly strong sound pressure at a specific frequency (a frequency indicating a strong sound pressure, a frequency having an elevated peak), thereby mitigating degradation in sound quality (i.e., deep level) in other frequencies, so that, as a result, an effect of enhancing frequency range smoothness can be expected. However, in this case, it is disadvantageous in that the overall sound pressure level (SPL) decreases and that a degradation in sound quality (deep level) effect occurs at another specific frequency (a frequency indicating a poor sound pressure, a frequency having a decreased peak), thereby resulting in no smoothness enhancement effect.

Despite the above-mentioned prior art inventions, the conventional piezoelectric speaker is disadvantageous in that is mostly has a weak sound at a low frequency range of 800 Hz or less, and that it has an insufficient smoothness of sound at a high frequency range. Generally, the size of a piezoelectric resonator that is attached to a diaphragm is thin (e.g., thickness of 200~300 μm) and has a form of a disc having a diameter of approximately 30~50 mm or a rectangular shape having a width and height of approximately 30~50 mm. A generic piezoelectric speaker having the above-described structure includes longitudinal vibration and two-dimensional vibration as basic vibrations that are first shown in the low frequency range. And, as the frequency increases to a high frequency range, a harmonic wave resonant mode of such basic vibrations is formed. In the resonant mode (a vibration form corresponding to when a frequency of an electrical signal corresponding to sound aligns with a unique (or natural) vibration frequency of the diaphragm, as the impedance (resonant resistance) decreases abruptly, the output increases. And, generally, when the resonant resistance is equal to or less than 5000, the size of the sound is sufficient, and since sufficient sound pressure is generated near the vibration frequency, the piezoelectric speaker may be interested in the size and shape of the piezoelectric resonator so that the resonant mode can be generated as much as possible at the low frequency range. As an example, when a rectangular (30×30 mm) piezoelectric resonator having a thickness of 300 μm is attached to a rectangular (50×70 mm) diaphragm (copper plate) having a thickness of 300 μm, an impedance-frequency property curve, such as the one shown in FIG. 3, was shown through a simulation. This structure has no significant problem at 1 kHz or higher, since the impedance is low, and, therefore, sufficient sound pressure can be generated. However, at 1 kHz or less, since the high impedance marks a level of 1 kΩ or higher, this structure has basic longitudinal vibration and two-dimensional vibration resonance points at approximately 350 Hz and 650 Hz, even in case of a resonant mode, since the impedance value marks a high level of 1 kΩ or higher, it is difficult for this structure to produce sufficient sound. In order for the sound pressure to be sufficient at a low frequency range (1 kHz or less), a larger number of resonant modes of the speaker unit should be produced at this frequency band, and the resonant resistance should be sufficiently low. Accordingly, sufficient sound pressure may be generated near the corresponding resonance frequency, and the speaker may be capable of producing good-quality sound throughout the entire frequency band.

This is a well-known property, and the theory of the low frequency range being capable of having various resonant modes when the size of the diaphragm and the size of the ceramic are sufficiently large, is a matter of common knowledge.

That is, a frequency constant (Nr) is a constant value that is obtained by multiplying the length (L) of a segment by the resonance frequency (fr), as shown below in Equation (1):

$$fr \times L = Nr(\text{constant}) \quad (1)$$

If the size (L) or area becomes larger, the resonance frequency becomes smaller, and this denotes that, if the size of the piezoelectric resonator or diaphragm becomes larger, resonance of the basic resonant mode (herein, among the various resonant modes that may occur when the frequency of the sound is increased from a low frequency to a high frequency, the first resonance that occurs is referred to as the basic resonant mode) occurs at a lower frequency, thereby enhancing the low frequency range sound pressure property.

As shown in the simulation result of FIG. 4, when a rectangular (110×130 mm) piezoelectric resonator having a thickness of 300 μm is attached to a rectangular (150×170 mm) diaphragm (copper plate) having a thickness of 300 μm, a frequency-impedance property that can produce sufficient sound at a low frequency range is shown.

As shown in FIG. 4, since the basic mode of the longitudinal vibration and two-dimensional vibration and the harmonic resonant mode occur multiple times even at 500 Hz and below, and since the resonant resistance is sufficiently low (500Ω or less), there is a likelihood of sufficient sound pressure being produced even at a low frequency range. However, even in this case, there lies a disadvantage in that, since the harmonic resonant mode does not exist in a 500~800 Hz band, a deep level may occur, thereby causing poor frequency band smoothness.

Additionally, if the diaphragm is to be manufactured despite the disadvantage of poor smoothness, there lies a problem in the piezoelectric ceramic fabrication process, in that it is very difficult to fabricate a thin piezoelectric resonator having a thickness of 300 μm or less and a large surface area (wherein the length of one segment is 150 mm or more), and there also lies a problem of a high fabrication cost.

Meanwhile, when a 30×30 mm piezoelectric resonator having a thickness that can be fabricated (300 μm) is used and the surface of the diaphragm is enlarged to 150×170 mm, it is apparent that various resonant modes occur at a low frequency range (1 kHz or below), as shown in FIG. 5, most of the resonant modes have a large resonant resistance exceeded several kΩ. Therefore, this structure is disadvantageous in that is cannot produce sufficient sound pressure.

Therefore, it is highly significant to derive a combination of a piezoelectric resonator and a diaphragm having sufficient sound pressure at a low frequency band (low frequency band). Most particularly, the development of a high-quality piezoelectric speaker that can meet with the demands for ultra-slim TV speaker is urgently required. However, the disadvantage of this case is that separate external power is required for performing initial charging of the semiconductor transformer.

DETAILED DESCRIPTION OF THE INVENTION

Technical Objects

An object of the present invention is to enhance acoustic properties of a piezoelectric speaker having the advantages of a thin speaker.

Most particularly, the object of the present invention is to provide a piezoelectric speaker that is required in panel speakers of large-sized TVs, mobile devices, and so on, that can generate sufficient sound pressure and produce stable bass sound (or low frequency sound) at the same time, by resolving the disadvantages of insufficient sound pressure properties in the low frequency band, and by enhancing the smoothness of the sound pressure level (SPL).

Technical Solutions

In order to achieve the above-described object of the present invention, provided herein is a piezoelectric speaker and a vibration module for a panel speaker including one speaker unit being configured by including a diaphragm, and at least 3 piezoelectric resonators each being independently configured and attached to one surface of the diaphragm.

Preferably, among the at least 3 piezoelectric resonators, each of at least 2 piezoelectric resonators may have a different surface area.

Preferably, among the at least 3 piezoelectric resonators, each of at least 2 piezoelectric resonators may have a different shape.

Preferably, among the at least 3 piezoelectric resonators, each of at least 2 piezoelectric resonators may have a same surface area.

Preferably, when the 3 piezoelectric resonators are attached to one surface of the diaphragm, at least one piezoelectric resonator may be further attached to an opposite surface of the diaphragm.

Preferably, the at least one piezoelectric resonator being further attached to the opposite surface of the diaphragm may be formed on an opposing of an area in-between the piezoelectric resonators being attached to the one surface of the diaphragm.

Preferably, when the at least 3 piezoelectric resonators vibrate, a virtual piezoelectric resonator may be formed in surrounding areas of the piezoelectric resonators.

Effects of the Invention

As described above, according to the present invention, the acoustic properties of a piezoelectric speaker having the advantages of a thin speaker may be enhanced. That is, when manufacturing a piezoelectric speaker with excellent properties, by manufacturing a speaker unit by combining a plurality of piezoelectric ceramics each being easily manufactured, cost-efficient, thin and having a small surface area, as compared to when manufacturing the speaker unit on a single thin piezoelectric ceramic having a large surface area, provide a piezoelectric speaker that is required in panel speakers of large-sized TVs, mobile devices, and so on, that can generate sufficient sound pressure and produce stable bass sound (or low frequency sound) at the same time may be provided, by producing excellent sound pressure properties in the low frequency band, and by enhancing the smoothness of the sound pressure level (SPL).

MODE FOR CARRYING OUT THE INVENTION

Figure 1:
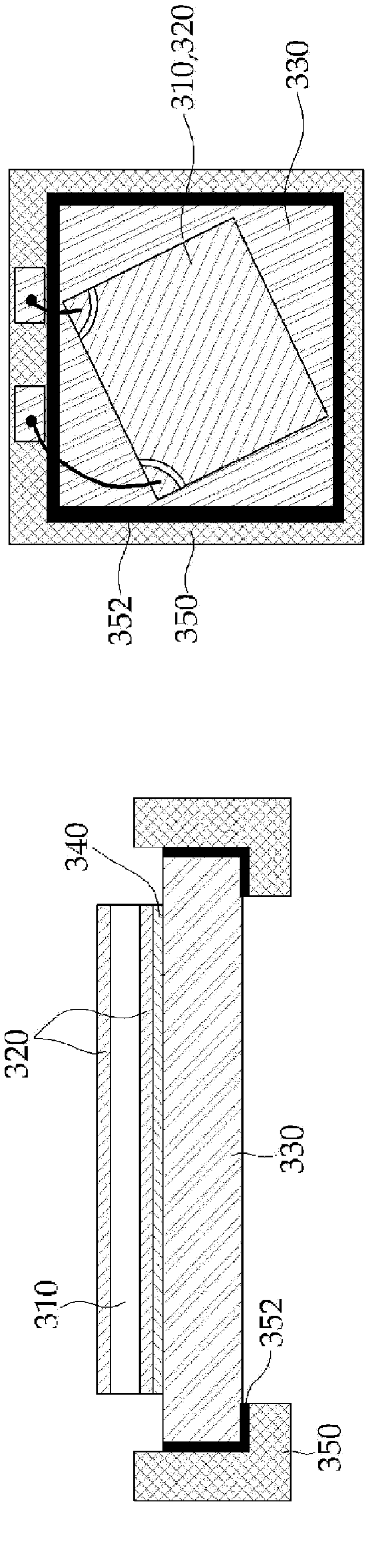
FIG. 1 is a diagram showing a piezoelectric speaker of a related art.
Figure 2:
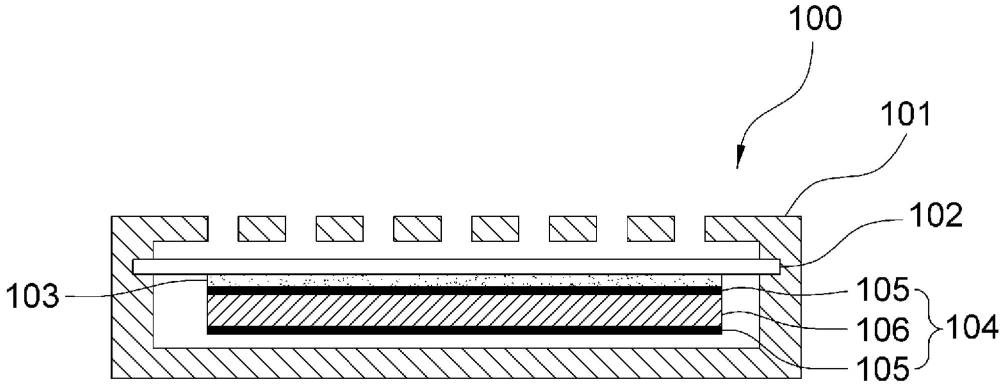
FIG. 2 is a diagram showing a basic configuration of a piezoelectric speaker.

Hereinafter, in order to allow anyone with ordinary knowledge and skills in the art to easily carry out the present invention, exemplary embodiments of the present invention will be described in detail with reference to the appended drawings. However, the present invention may be implemented in various forms and shall not be limited only to the exemplary embodiments described herein. Additionally, in the appended drawings, for clarity in the description of the present invention, parts that are not related to the description of the present invention have been omitted from the drawings, and, throughout the entire specification, similar parts have been assigned with similar reference numerals.

Throughout the entire specification, it shall be understood that, when a particular part is said to "include" a particular component, unless specified otherwise, this means that other components may be further included and does not mean that other components are excluded.

The present invention includes one speaker unit being configured by including a diaphragm being configured in a speaker and having a size of at least 100 $cm^2$ or more, and at least 2, preferably 3, piezoelectric resonators each being independently configured and attached to one surface of the diaphragm. Herein, the piezoelectric resonators generate high sound pressure output in a low frequency range according to sound input signals from a single diaphragm, and, accordingly, when one diaphragm operates in a specific vibration mode, the plurality of piezoelectric resonators operate as components of the corresponding vibration mode. And, in this case, the smoothness of the added surface of each of the individual piezoelectric resonator is more enhanced than the smoothness of the surface of a single piezoelectric resonator. Herein, if a surface area of the diaphragm is equal to 100%, an added surface of the piezoelectric resonators is equal to 40% or more.

At this point, the generated output is not independent sound waves being output from each of the piezoelectric resonators. The generated output is equivalent to a sound-wave being output from a single piezoelectric resonator having the same surface area as a total surface area of the individually distributed piezoelectric resonators. Herein, however, since a larger number of resonant modes are formed in a low frequency, as compared to a single piezoelectric resonator, a more enhanced sound quality is emitted.

Herein, the speaker does not include any other components apart from the diaphragm and the piezoelectric resonator(s). Therefore, when a combination of one piezoelectric resonator and diaphragm is referred to as a single unit speaker, this is specifically differentiated from the related art speaker, which applies a physical vibration propagation limiting factor to the unit speakers so that independent vibration may occur in-between each unit speaker.

Herein, if a surface area of the diaphragm is equal to 100%, when an added surface of the piezoelectric resonators is less than 40%, the resonant resistant increases, which prevent production of a wanted sound pressure. Additionally, there also lies a problem of degradation in the sound pressure property in the low frequency range. Therefore, in light of the above-mentioned numeric values, the added surface area of the piezoelectric resonators in comparison to the diaphragm has a critical significance.

If a piezoelectric resonator having a size that is almost the same as a diaphragm (a piezoelectric resonator having a large surface area almost equal to 100% of the surface area) is formed on the diaphragm, the sound pressure of the low frequency domain (approximately 1000 Hz or less) increases. Herein, most importantly, it is preferable that the diaphragm has a large size. Therefore, it is preferable that a minimum surface area of the diaphragm is equal to 100 $cm^2$ or more. Even though a large number of resonators is included, if the size of the diaphragm is small, the sound pressure at the low frequency range decreases, thereby resulting in poor sound quality at a low frequency band. Therefore, in light of the above-mentioned size, the size of the diaphragm has a critical significance.

The related art piezoelectric speaker is configured of one resonator formed on one diaphragm. Herein, since this structure generates a basic vibration mode and a harmonic resonant mode of a basic vibration, there are limitations is fabricating a thin and sufficiently large ceramic diaphragm. Therefore, due to such limitations, instead of applying a think and large ceramic diaphragm, the speaker can only be configured as a piezoelectric speaker having small-sized resonators attached to the diaphragm. And, as shown in Equation (1), since the basic vibration mode resonance frequency is positioned at a high frequency range, such speaker is disadvantageous in that the low frequency range is weak and that the SPL smoothness is weak due to a deep level that is formed between the high frequencies. Accordingly, the present invention is devised to reinforce the low frequency band sound pressure, which is the most significant disadvantage of the conventional piezoelectric speaker, and to enhance the smoothness of the corresponding frequency band. In order to implement such enhancements, a piezoelectric speaker unit uses a diaphragm having a larger surface area than the conventional piezoelectric speaker and has a larger surface area, which is occupied by the piezoelectric resonator(s) attached to the diaphragm, and, instead of using a large surface area of a single piezoelectric resonator, the present invention uses 3 or more piezoelectric resonators each having a small surface area. A single piezoelectric resonator having a large surface area is also thin, and, therefore, it is extremely difficult to fabricate a thin and smooth flawless piezoelectric resonator. Therefore, by attaching a plurality of piezoelectric resonators each having a size that can be easily fabricated by modern technology to a diaphragm, more excellent properties may be produced as compared to a speaker, which is configured by attaching a single piezoelectric resonator having a large surface area to a diaphragm.

Figure 3:
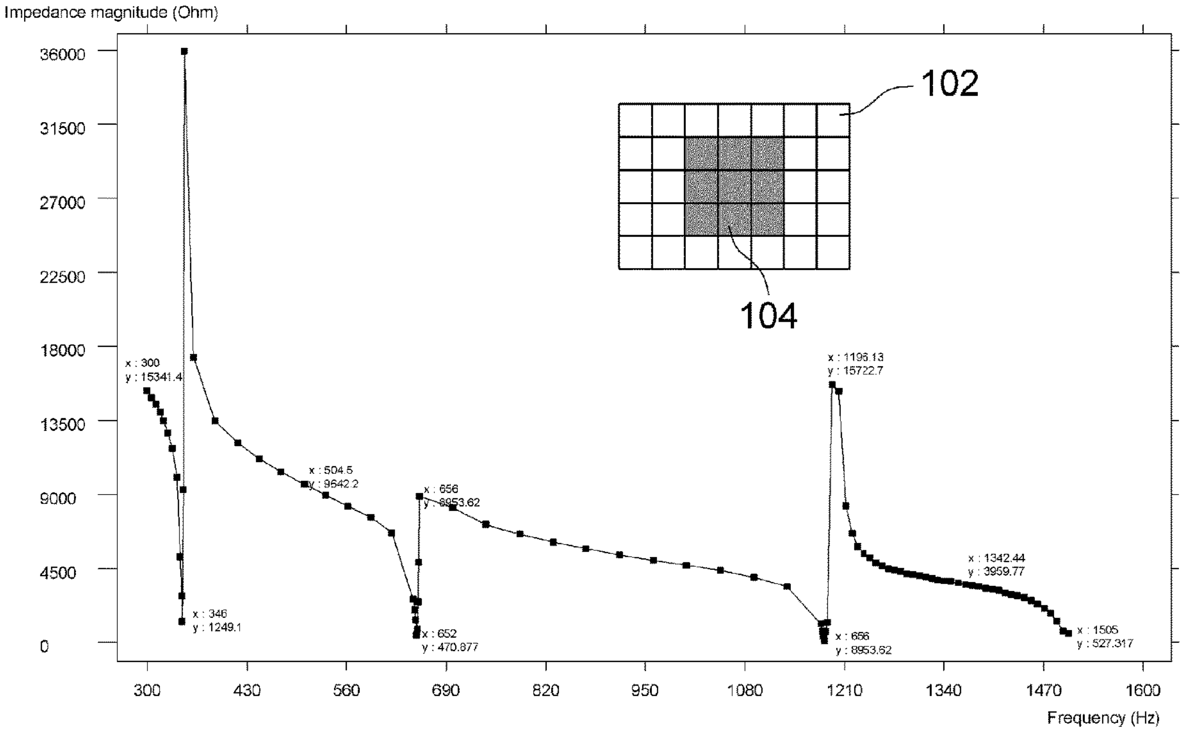
FIG. 3 is a graph showing impedance change and occurrence of resonance according to a frequency as sound wave properties of a piezoelectric speaker having a piezoelectric resonator of a predetermined size connected to a diaphragm.

The most significant disadvantage of the conventional piezoelectric speaker is a decrease in the sound pressure at a low frequency range (1 kHz or less). After fabricating a speaker unit (having a resonator attached to a diaphragm) by attaching a piezoelectric ceramic resonator to a diaphragm, when observing the frequency vibrations of the speaker unit at a frequency band, as shown in FIG. 3, the frequency-impedance property of a speaker having a 50×70 mm diaphragm having a thickness of 300 μm and a 30×30 mm piezoelectric resonator shows that a longitudinal basic vibration and a two-dimensional basic vibrations are each formed at a low frequency range of approximately 350 Hz and 650 Hz. Herein, however, since the longitudinal basic vibration has a large resistance of 1.25 kΩ or more, the sound pressure is insignificant, and the two-dimensional basic vibration may have a sound pressure of 5000 or less. As a result, this indicates that this structure has a very weak sound pressure property, wherein a single resonance having a sound pressure property of 1 kHz or less at a low frequency range occurs only once at a specific frequency. Therefore, a speaker having the structure shown in FIG. 3 has a noticeably degraded low frequency range sound pressure property. That is, FIG. 3 shows a small-sized diaphragm having a surface area of 35 $cm^2$. And, herein, there are only two resonant modes at 1000 Hz or less. Therefore, even if the speaker is configured of a plurality of resonators, the low frequency resonance peak may not be improved. Therefore, it is preferable to configure the speaker with a diaphragm having a size of 100 $cm^2$ or more, and, accordingly, as it will be described later on, the low frequency resonance peak may be improved.

Meanwhile, a thin piezoelectric resonator (generally having a thickness of 300 μm or less) is fabricated by being processed by a procedure of molding using extrusion molding, tape casting, cutting to a wanted size, and sintering. Thereafter, electrodes are attached to both sides of the sintered body so as to provide piezoelectric properties to the sintered body through a poling procedure. The piezoelectric body is then attached to a diaphragm (which is formed of materials such as metal, plastic, and so on) by an adhesive, thereby forming a speaker unit. The speaker unit that is fabricated as described above reacts to acoustic electrical signals, thereby generating sound. And, in order to have sufficient acoustic properties at a low frequency range (1 kHz or less), the electrical signals should cause frequent resonant modes at low frequencies, and the resonant resistance should be sufficiently low (5000 or less). For this, the size of the diaphragm should be at least 100×100 mm (100 $cm^2$) or more, and the size of the corresponding piezoelectric resonator should be at least 60×60 mm (36% of the surface area of the diaphragm). Preferably, if the piezoelectric resonator has the size of 80×80 mm or more, the low frequency range properties are expected to be good, and as the size becomes larger the low frequency range sound pressure properties are also improved. Generally, it is preferable that the added surface area of the piezoelectric resonators is 40% or more of the surface area of the diaphragm.

Figure 4:
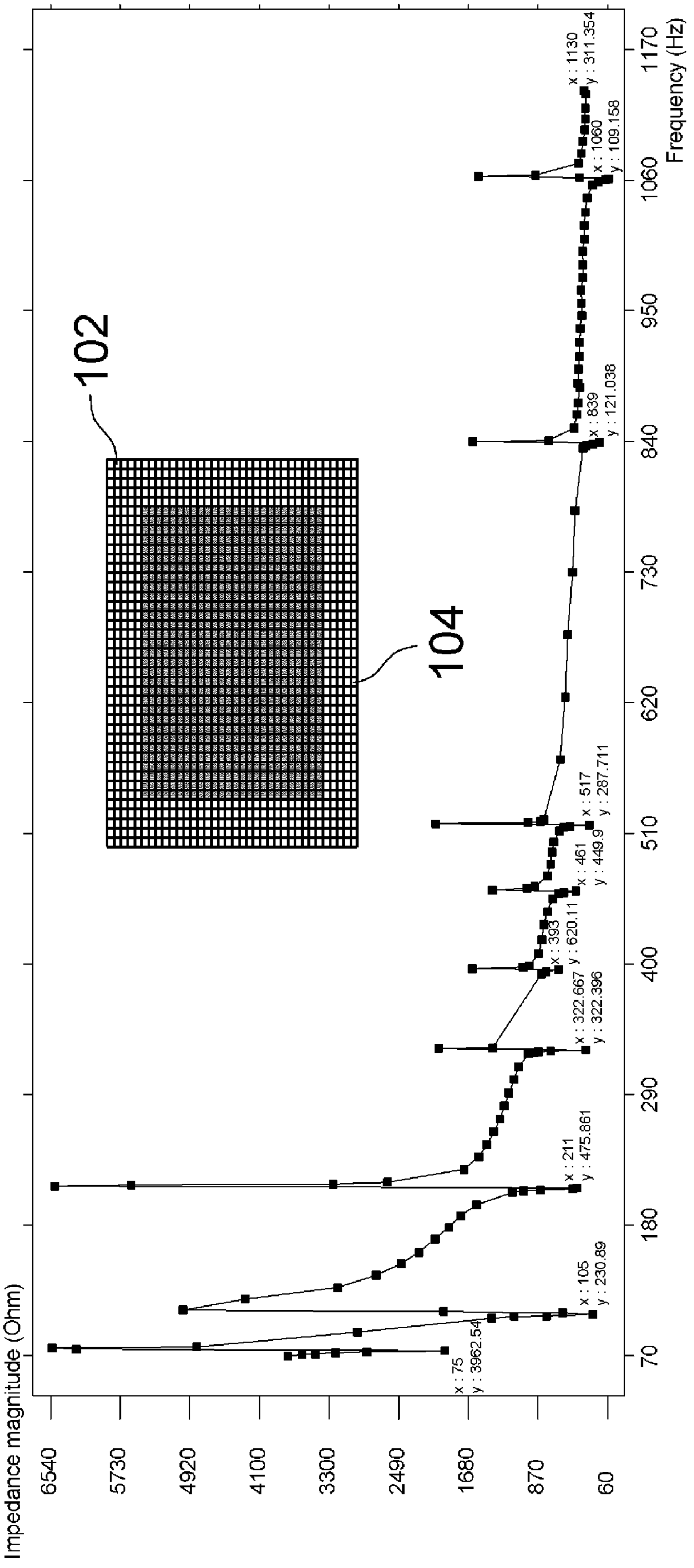
FIG. 4 is a graph showing impedance change and occurrence of resonance according to a frequency as sound wave properties of a piezoelectric speaker, wherein sizes of the piezoelectric resonator and diaphragm are larger than those of FIG. 3.

However, according to modern ceramic processing, it is difficult to manufacture such thin and wide piezoelectric ceramic resonator by performing sintering. And, even if such ceramic resonator is manufactured, many trials and errors need to be carried out, which may lead to a considerably high production cost. Meanwhile, as the size of the diaphragm and piezoelectric resonator becomes larger, the low frequency range properties become more improved. However, even if such large-sized piezoelectric ceramic resonator is manufactured, in case of the SPL properties of the speaker unit, there lies a problem in that a distance between the frequencies, in which the harmonic resonant mode occurs in the basic resonant mode, becomes larger. Referring to resonant property simulation results of a speaker having a diaphragm size of 150×170 mm and a resonator size of 110×130 mm, as shown in FIG. 4, unlike the results shown in FIG. 3, although it is apparent that frequent resonance occurs at a low frequency, it is also apparent that the resonant mode does not occur between approximately 500~800 Hz. When the distance between the frequencies is large, a peak deep effect may occur, and, eventually, the SLP smoothness also becomes poor.

If the diaphragm has a large size, the low frequency range sound pressure property is good even if the speaker is configured of only one piezoelectric resonator. That is, although there is a minor disadvantage in the sound pressure properties, this structure is mostly preferable. However, in light of the manufacturing process, it is difficult to manufacture a large surface piezoelectric resonator. Therefore, as a means of compensating for the minor disadvantage of the sound pressure properties while yielding such preferable properties, instead of using a large-surface piezoelectric resonator, the present invention uses a plurality of small-surface piezoelectric resonators that can be easily manufactured.

Figure 5:
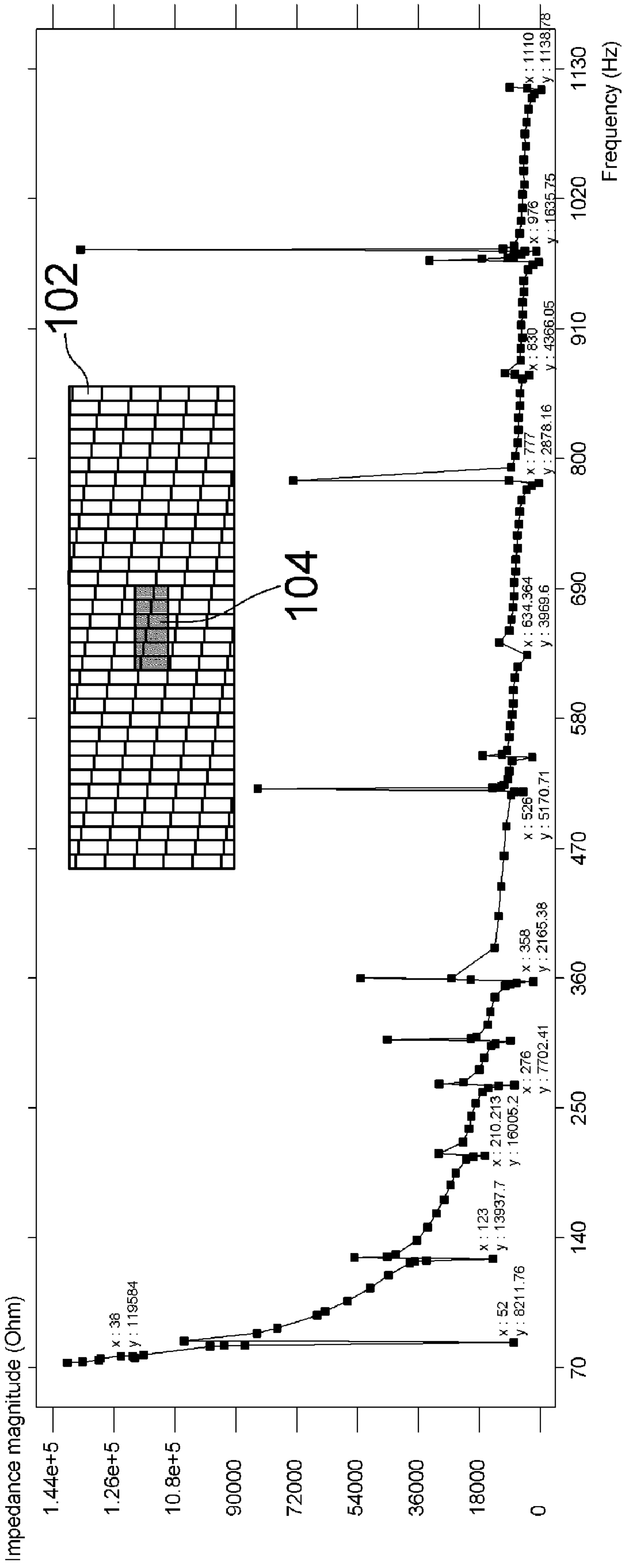
FIG. 5 is a graph showing impedance change and occurrence of resonance according to a frequency as sound wave properties of a piezoelectric speaker, which is manufactured by combining a diaphragm having a same size as that of FIG. 4 and a piezoelectric diaphragm having a smaller size than that of FIG. 4.

Additionally, as shown in FIG. 5, a diaphragm (150×170 mm) having the same size as the one used in FIG. 4 is used, and only the size of the resonator is reduced to 20×30 mm. And, as shown in Equation (1), although the resonant mode occurs frequently in the low frequency by using the large diaphragm, due to the large resonant resistance of 1 kΩ or more, the wanted sound pressure may not be produced.

In order to compensate for such disadvantage (a peak deep effect having no resonant mode at a specific section of the low frequency range) and to maintain the advantage (generating the resonant mode comparatively frequently at 1 kHz or less) as it is, if a plurality of relatively small-sized and easily fabricated piezoelectric ceramic resonators are attached to a single large-sized diaphragm, due to the plurality of resonators, a plurality of virtual piezoelectric resonators having a new size is expected to be formed. And, accordingly, since a plurality of new basic resonance and harmonic waves are generated according to such virtual piezoelectric resonators, this structure is advantageous in that frequency resonant modes are frequently generated even at a low frequency, thereby reducing the peak deep effect.

That is, providing piezoelectric ceramic resonators by splitting a single piezoelectric ceramic resonator into a plurality of piezoelectric ceramic resonators has a new meaning that exceeds the mere adjustment of the size and number of piezoelectric ceramic resonators.

Figure 7:
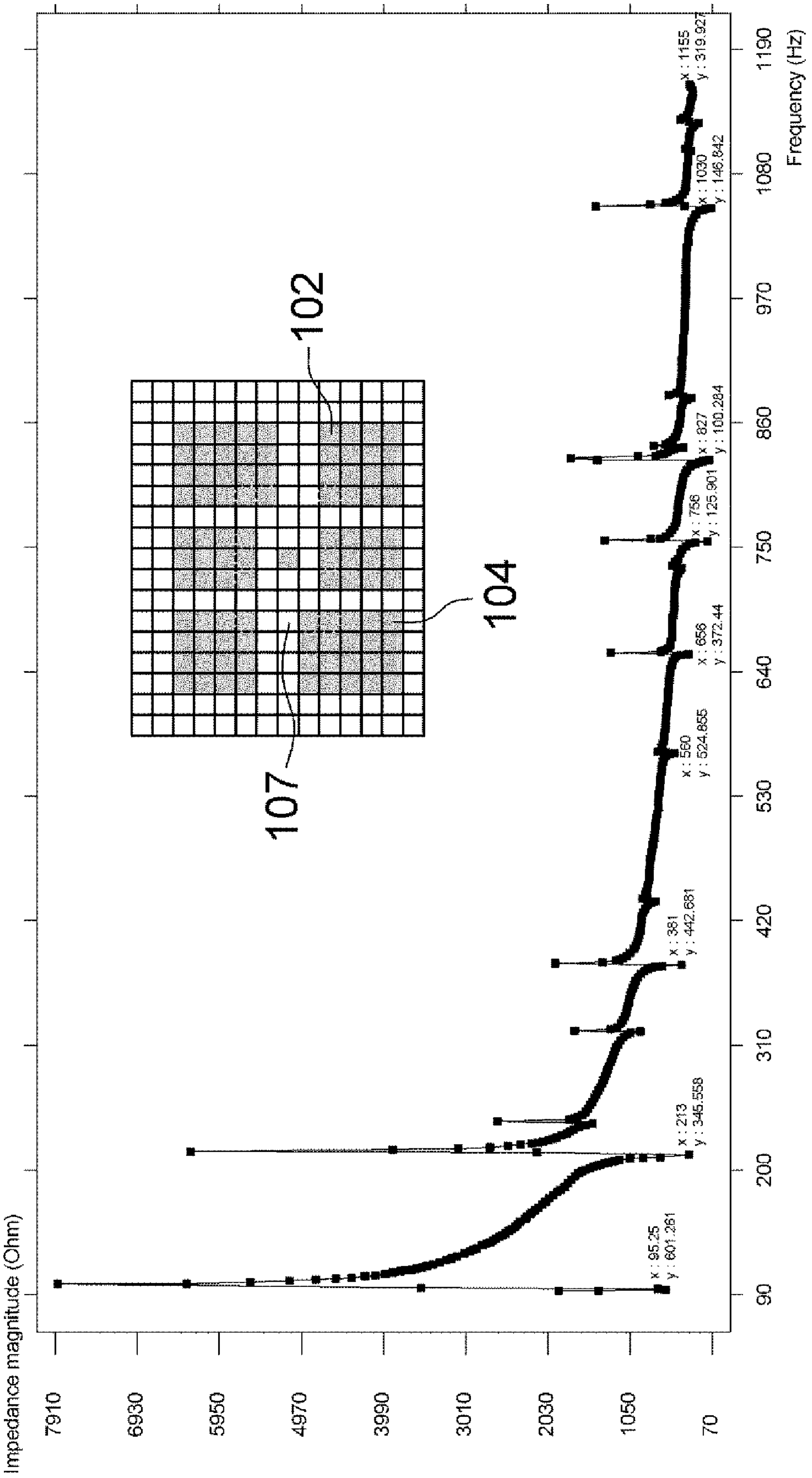
FIG. 7 is a graph showing impedance change and occurrence of resonance according to a frequency as sound wave properties of a piezoelectric speaker, which is manufactured by further combining a piezoelectric resonator on a rear surface of the diaphragm in the piezoelectric speaker of FIG. 6.

As shown in FIG. 4, it is apparent that, in the resonance properties of a speaker that is configured of one large resonator, a resonant mode is not formed in a frequency section of 520 Hz~820 Hz. Conversely, as shown in FIG. 7, referring to the impedance-frequency property graph of a speaker, which is configured by combining 7 small-sized resonators 104 forming a same surface area as the surface area being occupied by the one large-sized resonator 104, which is shown in the structure of FIG. 4, and one resonator 107 formed on an opposite surface of the diaphragm, it is apparent that the resonant mode is formed 4~5 times at the same frequency section (520 Hz~820 Hz). In this case, it is apparent that the smoothness improvement effect is distinctively noticeable as compared to the speaker that is configured of only one large resonator.

This structure has the same advantage of producing a strong sound pressure in accordance with the generation of a resonant mode at a low frequency that can be implemented when one large-sized piezoelectric ceramic resonator is attached to the diaphragm. This structure also has the advantage of having excellent SPL smoothness, by controlling the occurrence of a peak deep effect due to the generation of various resonant modes at a predetermined frequency band by a plurality of virtual piezoelectric resonators having various sizes, which are formed by the combination of multiple piezoelectric resonators.

Figure 6:
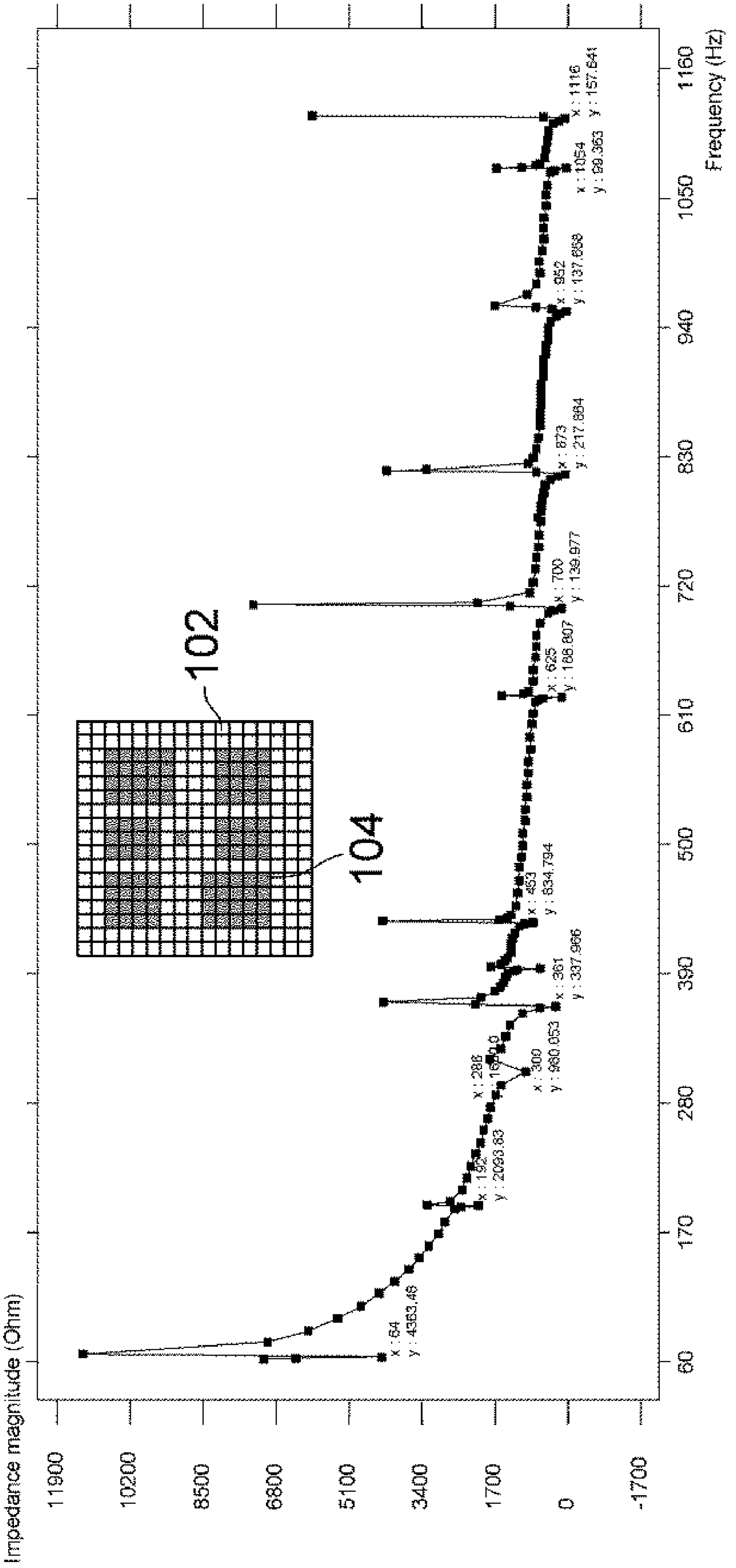
FIG. 6 is a graph showing impedance change and occurrence of resonance according to a frequency as sound wave properties of a piezoelectric speaker, which is manufactured by combining 6 piezoelectric resonators each having a different size on one surface of a diaphragm according to an embodiment of the present invention.

For example, as shown in FIG. 6 according to an embodiment of the present invention, when configuring a piezoelectric speaker by arranging 2 piezoelectric resonators 1 (40×40 mm), 2 piezoelectric resonators 2 (30×40 mm), 2 piezoelectric resonators 3 (50×40 mm), and 1 piezoelectric resonator 4 (10×10 mm) on one side of a diaphragm having a size of 150×170 mm, referring to the frequency-impedance property, it is apparent that a larger number of resonant modes are generated at a low frequency, as compared to when only a single relatively large-sized piezoelectric resonator (130×150 mm) is used, as shown in FIG. 4. Additionally, when using only a single relatively large-sized piezoelectric resonator (130×150 mm), as shown in FIG. 4, although a harmonic mode is not detected at the frequency range of 500~800 Hz, when configuring a piezoelectric speaker according to an embodiment of the present invention, as shown in FIG. 6, it is apparent that various harmonic modes are generated in the frequency range of 500~800 Hz. Therefore, this indicates that this structure is very advantageous in improving the sound pressure property.

Additionally, as shown in FIG. 7, when configuring a piezoelectric speaker by arranging 2 piezoelectric resonators 1 (40×40 mm), 2 piezoelectric resonators 2 (30×40 mm), 2 piezoelectric resonators 3 (50×40 mm), and 1 piezoelectric resonator 4 (10×10 mm) on one side of a diaphragm having a size of 150×170 mm, and by additionally attaching a new piezoelectric resonator (50×70 mm) on an opposite side of the diaphragm, it is apparent that a more dense harmonic resonant mode is generated in the frequency range of 500~800 Hz and that a vibration mode having low resonant resistance may be generated. This may have a greater effect if the size of the diaphragm is increased and a larger number of resonators are arranged and attached to the diaphragm. Thus, more abundant sound may be produced at the low frequency range, and the smoothness may also be enhanced.

At this point, it may be more advantageous for the generation of a dense harmonic resonant mode to arrange the at least one piezoelectric resonator, which is attached to the opposite side of the diaphragm, to an opposing area of the area that is formed in-between the piezoelectric resonators being attached to the one surface of the diaphragm.

A comparison of FIG. 4, FIG. 6, and FIG. 6 is summarized in the table shown below. The investigated frequency range is defined as a range of 390~840 Hz. And, the maximum limit and the minimum limit are set to a range less than 10 inclusive of values exceeding or less than 10.

TABLE 1

| | Number of harmonic resonant modes | Impedance (resonance resistance) range (Ω) |
|---|---|---|
| FIG. 4 | 4 | 121~620 |
| FIG. 6 | 6 | 140~835 |
| FIG. 7 | 8 | 100~800 |

*FIG. 4: 1 piezoelectric resonator (110 × 130 mm) on one side of a diaphragm of 150 × 170 mm
*FIG. 6: 2 piezoelectric resonators 1 (40 × 40 mm), 2 piezoelectric resonators 2 (30 × 40 mm), 2 piezoelectric resonators 3 (50 × 40 mm), and 1 piezoelectric resonator 4 (10 × 10 mm) on one side of a diaphragm of 150 × 170 mm
*FIG. 7: Add a piezoelectric resonator 107 (50 × 70 mm) on a rear surface of a diaphragm having the diaphragm and resonator arrangement shown in FIG. 6

As shown in the table presented above, all resonant resistances are sufficiently low. However, in the frequency range of 390~840 Hz, the number of harmonic resonant modes in FIG. 4 is equal to 4, which is a lower number than those of FIG. 6 and FIG. 7. Therefore, in case of FIG. 6 and FIG. 7, the sound quality at the low frequency range may be consistent and excellent.

Additionally, although the maximum limit of the impedance in FIG. 4 has increased as compared to FIG. 6 and FIG. 7, when considering the difference in sound quality, such degree of difference in impedance is not significant. And, therefore, in case of the minimum limit, it is apparent that the case of FIG. 7 is the lowest.

Therefore, it is apparent that FIG. 6 and FIG. 7, which include the technical scope and spirit of the present invention, may derive a more excellent sound pressure property as compared to FIG. 4. Additionally, the case of FIG. 6 and FIG. 7 may be more easily implemented at a lower fabrication cost as compared to FIG. 4.

It shall be noted that the embodiments set forth herein are provided to describe the embodiments according to the present invention, and not to limit the present invention. Furthermore, it may be understood by anyone with ordinary skills in the field that other various embodiments may also be implemented without deviating from the technical scope and spirit of the present invention.

What is claimed is:

1. A piezoelectric speaker and a vibration module for a panel speaker, comprising:

one speaker unit being configured by including:

a diaphragm being configured in a speaker and having a size of at least 100 $cm^2$ or more; and at least 3 piezoelectric resonators each being independently configured and attached to one surface of the diaphragm, wherein the piezoelectric resonators generate high sound pressure output in a low frequency range according to sound input signals from a single diaphragm.

2. The piezoelectric speaker and a vibration module for a panel speaker of claim 1, wherein, among the at least 3 piezoelectric resonators, each of at least 2 piezoelectric resonators has a different surface area.

3. The piezoelectric speaker and a vibration module for a panel speaker of claim 1, wherein, among the at least 3 piezoelectric resonators, each of at least 2 piezoelectric resonators has a different shape.

4. The piezoelectric speaker and a vibration module for a panel speaker of claim 3, wherein, among the at least 3 piezoelectric resonators, each of at least 2 piezoelectric resonators has a same surface area.

5. The piezoelectric speaker and a vibration module for a panel speaker of claim 1, wherein, when the 3 piezoelectric resonators are attached to one surface of the diaphragm, at least one piezoelectric resonator is further attached to an opposite surface of the diaphragm.

6. The piezoelectric speaker and a vibration module for a panel speaker of claim 5, wherein, the at least one piezoelectric resonator being further attached to the opposite surface of the diaphragm is formed on an opposing area of an area in-between the piezoelectric resonators being attached to the one surface of the diaphragm.

7. The piezoelectric speaker and a vibration module for a panel speaker of claim 1, wherein, when the at least 3 piezoelectric resonators vibrate, a virtual piezoelectric resonator is formed in surrounding areas of the piezoelectric resonators.

8. The piezoelectric speaker and a vibration module for a panel speaker of claim 1, wherein a ratio of an added surface of the piezoelectric resonators to a surface area of the diaphragm is greater than or equal to 40%.

* * * * *